H. D. DANN.
STEAM COOKER.
No. 180,009. Patented July 18, 1876.
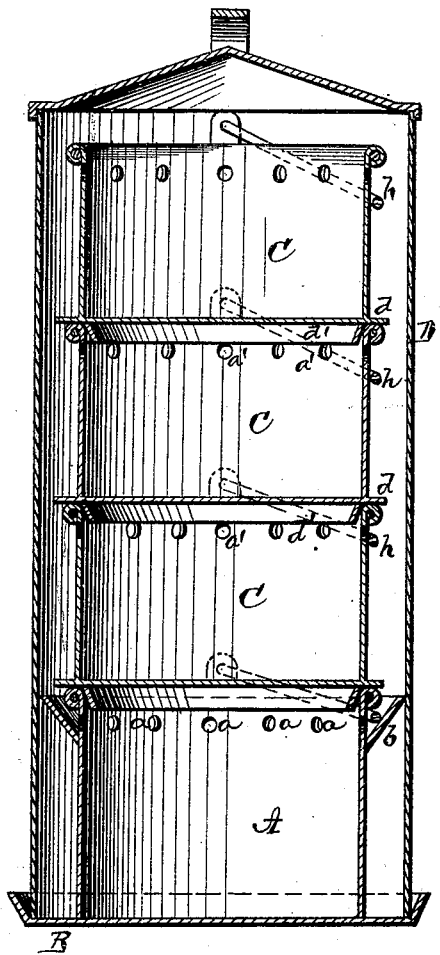
WITNESSES
F. L. Ourand
C. L. Evert
INVENTOR
H. D. Dann,
By T. H. Alexander
Attorneys

UNITED STATES PATENT OFFICE.

HENRY D. DANN, OF OSHKOSH, WISCONSIN, ASSIGNOR TO HIMSELF AND CHARLES C. PAIGE, OF SAME PLACE.

IMPROVEMENT IN STEAM-COOKERS.

Specification forming part of Letters Patent No. 180,009, dated July 18, 1876; application filed April 1, 1876.

*To all whom it may concern:*

Be it known that I, HENRY D. DANN, of Oshkosh, in the county of Winnebago and State of Wisconsin, have invented certain new and useful Improvements in Steam-Cookers; and I do hereby declare that the following is a full, clear, and exact description thereof, reference being had to the accompanying drawings, and to the letters of reference marked thereon, which form part of this specification.

The nature of my invention consists in the construction and arrangement of a steam-cooker, as will be hereinafter more fully set forth.

In the annexed drawings the figure represents a vertical section of my invention.

My steam-cooker consists of a series of vessels placed one on top of the other. A is the bottom vessel, having its bottom projecting all around, and forming as it were, a pan, B, around the same. In the upper edge of the vessel A are a number of openings, $a\ a$, and below the same, around the outside of the vessel, is an inclined rim, $b$, as shown. The upper vessels C C are all alike, and formed with outward flanges $d$, and downward flanges $d'$ to rest upon, and fit within, the vessel immediately below each one. These vessels are also provided at their upper edges with openings $a'$. Over the whole is placed a case or cylinder, D, resting on the pan B. All the vessels A C are provided with suitable bails $h$. Water is placed in the bottom vessel A, from which steam pours out through the openings $a$ therein, the rim or flange $b$ around said vessel preventing the water from boiling over, and also catches the condensed steam that might run down the sides of the upper sections. The steam from the bottom vessel A passes through the openings $a'$ at the top of each vessel C, immediately under the bottom of the vessel just above it, the case D keeping the steam in, and also keeping the cold air from cooling the vessels, while the steam envelops both the inside and outside of all the vessels. As the steam condenses and passes down within the case to the pan B, it is at once converted into steam again.

Having thus fully described my invention, what I claim as new, and desire to secure by Letters Patent, is—

The combination of the vessel A, having a pan, B, at its bottom, which surrounds the walls of the vessel, and provided with openings $a$ and flange $b$ with the vessels C C, and the removable cylinder D, open at its bottom, and resting on the pan B, all substantially as and for the purposes herein set forth.

In testimony that I claim the foregoing as my own I affix my signature in presence of two witnesses.

HENRY D. DANN.

Witnesses:
D. J. PARKINSON,
L. E. POND.